United States Patent [19]

Hedlund et al.

[11] Patent Number: 5,043,643
[45] Date of Patent: Aug. 27, 1991

[54] ENERGIZING SYSTEM FOR A VARIABLE RELUCTANCE MOTOR

[75] Inventors: Gunnar Hedlund; Henrik Lundberg, both of Stockholm, Sweden

[73] Assignee: EMS Electronic Motor Systems AB, Stockholm, Sweden

[21] Appl. No.: 198,816

[22] PCT Filed: Oct. 1, 1987

[86] PCT No.: PCT/SE87/00442

§ 371 Date: May 26, 1988

§ 102(e) Date: May 25, 1988

[87] PCT Pub. No.: WO88/02951

PCT Pub. Date: Apr. 21, 1988

[30] Foreign Application Priority Data

Oct. 10, 1986 [SE] Sweden .............................. 8604307

[51] Int. Cl.$^5$ .............................................. H02P 6/02
[52] U.S. Cl. ..................................... 318/254; 318/701
[58] Field of Search ................ 318/138, 254, 439, 701

[56] References Cited

U.S. PATENT DOCUMENTS

| | | | |
|---|---|---|---|
| 3,980,933 | 9/1976 | Piatkowski, Jr. ................... | 318/138 |
| 4,027,212 | 5/1977 | Studer ................................ | 318/254 X |
| 4,234,838 | 11/1980 | Langley et al. ................... | 318/254 X |
| 4,253,053 | 2/1981 | Ray et al. .......................... | 318/254 X |
| 4,442,386 | 4/1984 | Uchida et al. ..................... | 318/254 |
| 4,520,302 | 5/1985 | Hill et al. .......................... | 318/696 |
| 4,563,619 | 1/1986 | Davis et al. ....................... | 318/138 |
| 4,598,865 | 6/1986 | Jahns ................................. | 318/138 X |
| 4,611,157 | 9/1986 | Miller et al. ...................... | 318/138 X |
| 4,641,066 | 2/1987 | Nagata et al. .................... | 318/439 X |

OTHER PUBLICATIONS

"Inverter Drive for Switched Reluctance Motor: Circuits and Component Ratings", *IEE Proc.*, vol. 128, No. 2, Mar. 1981, by R. M. Davis et al., pp. 126–136.

"Waveform Sensing Closes the Loop in Step Motor Control", *Production Engineering*, Feb., 1977, by J. R. Frus et al., pp. 47–49.

*Primary Examiner*—Bentsu Ro
*Attorney, Agent, or Firm*—Young & Thompson

[57] ABSTRACT

Drive system for a variable reluctance motor having a pulsated drive. The motor has a stator provided with one or more windings for one or more phases, and a rotor which, upon rotation, co-acts with the magnetic circuit in each stator phase and produces in the magnetic circuit for each stator winding a permeance which changes with changes in the rotor angle. A sensing and control circuit (1-10) senses the inductance in the phase winding (L1, L2, L3) in each phase, at least during a part of a rotor revolution. Upon the indication of a pre-determined inductance $L_k$, the circuit permits the rotational position of the rotor at which the determined inductance $L_k$ was indicated to constitute a starting point for determining a rotational position $\theta_{OFF}$ for changing the energized state of the phase winding.

14 Claims, 4 Drawing Sheets

ENERGIZING SYSTEM FOR A VARIABLE RELUCTANCE MOTOR

BACKGROUND OF THE INVENTION

The present invention relates to an energizing circuit for a reluctance motor.

Variable reluctance motors of the type for which the energizing system of the invention is applicable demand repeated commutation between the different phases in a predetermined sequence. Commutation is intended to mean switching the voltage source from one phase winding to another, which has to be done in order to keep the driving torque in a desired direction of rotation during the rotation.

The usual way to control the commutation from one phase to another in variable reluctance motors, particularly switched type drive motors, is to use at least one rotor position sensor providing signals in dependence of the rotation position of the rotor in relation to the stator, hereinafter referred to as the rotor position. This means, however, that extra elements must be provided at the rotor, which in practice have been associated with some inconveniences and give rise to errors, particularly in severe environments.

Motors working with variable reluctance are well-known and belong to the group of brushless DC-motors. The type of variable reluctance motors for which the invention is intended has a stator having one or several excitation windings provided in one or several phases having separate energizing of the windings belonging to a respective phase. Both the stator and the rotor are normally provided with salient poles or teeth. The rotor has no winding. The stator and the rotor provide a magnetic circuit in order to generate a mechanical rotational torque, which is essentially proportional to the square of the ampere-turns of the energized winding and to the variation of the permeance to the rotor position. The movement of the rotor in relation to the stator causes a variation of the reluctance and consequently of the permeance in the magnetic circuit of the stator winding.

A rotational torque in the driving direction of the motor is provided only when the ampere-turns of the winding are maintained during a rotor position interval, in which the permeance is increasing with the rotor position change. Therefore, the intention is to keep every winding excited only during such an interval for the winding. From driving technical reasons it is suitable, but not necessary, to have only one stator phase excited at the time, i.e. without overlap between the phase excitations.

Commutation from one phase to another can be made such that every phase winding is connected during a rotor position interval, in which the permeance is increasing with the rotor position change. The feeding to each phase winding must in this case be disconnected or lowered during every rotor position interval, in which the permeance is decreasing with the rotor position change. As mentioned above the most common way is therefore to use extra rotor position sensors to sense the rotor position currently and to control the feeding of the voltage supply with a sensor controlled circuit.

However, the desire is to get rid of these rotor position sensors. Several attempts have been made to use the variation of current or voltage characteristics of the stator windings and associated circuits to give an indication on suitable times for connection and disconnection of the voltage supply.

A problem inherent with the control of switched variable reluctance motors of the driving type without any rotor position sensors is the desire that the driving must be provided both at low and high rotation speed. Most of the earlier systems having sensing of the motor characteristics to control the excitation voltages for a motor have primarily been adapted to step motors and operate well for relatively low rotation speed but operate worse or not at all when the rotation speed exceeds 50% of the maximum rotation speed of the motor.

BRIEF DESCRIPTION OF THE PRIOR ART

In one known reluctance motor control system, described in U.S. Pat. No. 3,980,933, there is sensed the electromotive force (EMF) induced in the stator winding as the rotor rotates and when the output from a switching device is non-conducting. The output of the switching device is made conductive when the EMF reaches a predetermined level. This motor requires a considerable bias current in order to afford interference margins. This results in power losses. Furthermore, because no energizing current passes through the winding during the time period in which the rotor position is sensed, it is not possible to load the motor to its maximum. Consequently, an exciting or energizing current must be passed constantly through one of the phase windings.

In the case of another reluctance motor control system, described in U.S. Pat. No. 4,520,302, means are provided for measuring the time during which the flow of current through a stator winding rises or falls from one level to another, in order to provide an indication of the rotor position. Thus, solely the current flow is sensed during this control. This system, which has been designed for controlling a stepping motor, affords poor resolution at high speeds, e.g. speeds exceeding 50% of the maximum motor speed.

SUMMARY OF THE INVENTION

The object of the invention is to provide a control for a variable reluctance motor which has no rotor position sensor but which can still drive the motor at all rotation speeds and loads.

According to the invention, a signal for indication of a determined rotor position is created at rotational speeds above a given speed $\omega_n$. The signal is created from the current in and the voltage across a phase winding without the motor drive being affected directly by the measuring process. The signal is used in order to determine the exact moment of commutation. Thus, a function is provided which at speeds above $\omega_n$ exactly corresponds to the function which is provided when rotor position sensors are used.

During the rotation of the rotor the inductance of each phase winding is changed due to the permeance changing during rotation. The changing is given in accordance with a given curve form in which a given rotor position corresponds to a given inductance in the phase winding. According to the invention, the time (corresponding to a given rotor position) is detected for each phase winding when the inductance of the phase winding reaches a predetermined value $L_k$. A calculating unit then calculates the time point, using the detected time point, when the commutation is to be made where the voltage supply is disconnected from the phase winding which up until then has been the driving one and is connected to the phase winding in turn to be the driving one.

BRIEF DESCRIPTION OF THE FIGURES

The invention will now be described in more detail with reference to the accompanying drawings, in which.

DETAILED DESCRIPTION

Figure 1:
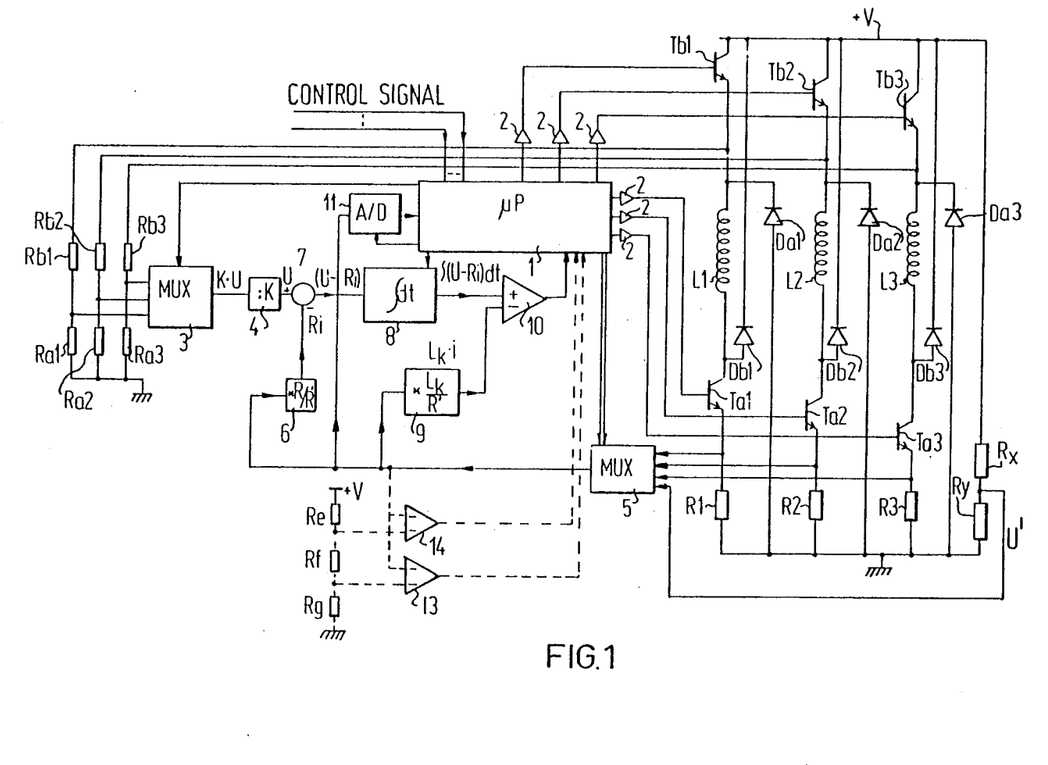
FIG. 1 is a circuit diagram which illustrates one embodiment of the control system according to the invention.

FIG. 1 illustrates three phase windings L1, L2, L3 on the stator of a three-phase reluctance motor. The invention is not restricted to the number of phases of the motor, and three phases are illustrated solely by way of example. The motor is driven by a d.c. voltage V, which may be 310 V for example, this voltage being normal for drive-type and switch-type reluctance motors. Between ground and the positive terminal of the voltage source, the phase winding L1 lies in a circuit which incorporates a current measuring resistor R1, the emitter-collector-path of a power transistor Ta1, the phase winding 1, and a power transistor Tb1. In this circuit the lower transistor Ta1 is biased to saturation during the whole of the time period over which the phase winding L1 is energized, while the upper transistor Tb1 is pulsed during the energizing interval of the phase, in the manner normal with switched reluctance motors, with which each energizing pulse for one phase is divided into part pulses. The process of dividing a drive pulse into part pulses does not form part of the actual invention and will not therefore be described in more detail. A diode Da1 is connected with its anode to ground and its cathode to the part of the phase winding L1 remote from the transistor Ta1, in order to maintain the current through the phase winding L1 throughout the whole of the energizing pulse interval. A diode Db1 is connected with its anode to the part of the phase winding L1 remote from the transistor Tb1 and the positive terminal, in order to provide a current circuit in which current can be rapidly drained from the phase winding L1 as soon as the transistor Ta1 is deactivated, i.e. blocked.

Each of the remaining phase windings L2 and L3 are connected to a respective circuit of the same kind. Thus, the phase winding L2 is incorporated in a circuit comprising a current measuring resistor R2, two power transistors Ta2, Tb2 and two diodes Da2, Db2, and the phase winding L3 is incorporated in a circuit comprising a current measuring resistor R3, two power diodes Ta3, Tb3 and two diodes Da3, Db3.

Switching of the transistors to their respective on-and off modes is controlled by a control unit 1. The control unit is preferably a microprocessor or microcomputer, although a circuit constructed from conventional circuit components may be used instead. The control unit 1 has six outputs, each of which is connected, via a respective amplifier 2, to the gating means of a respective transistor Ta1, Ta2, Ta3, Tb1, Tb2, Tb3, for the purpose of gating each transistor individually.

According to the invention, there is determined for each phase winding the timepoint $t_k$ which corresponds to the rotor position $\theta_k$ when the inductance L in the phase winding during the rotor position interval in which the inductance is increasing with the rotor position change reaches a predetermined inductance value $L_k$. In order to test the condition $L > L_k$, the voltage across the phase winding is integrated, and the integrated value is compared to the product of the value of the current strength in the phase winding and the predetermined inductance $L_k$.

The $L > L_k$ condition, hereinafter referred to as the fundamental condition, can be derived in accordance with the following:

The differential equation $$(U - R^*i) = d(L^*i)/dt \qquad (1)$$

describes the relation between the voltage U across and the current i in a coil having the resistance R and the inductance L. It is presumed that the coil in this case is some one of the phase windings in series with one of the transistors Ta1, Ta2 or Ta3 and one of the current measure resistors R1, R2 or R3, since the voltage drop across the transistor is negligible. Then, the resistance R is composed by the resistance of the phase winding and the resistance of the current measure resistor. The voltage U is composed by the voltages across the phase winding, the transistor and the current measure resistor.

The equation (1) is re-written as $$\int_{t_0}^{t_1} (U - R^*i)dt = (L^*i)\bigg|_{t=t_1} - (L^*i)\bigg|_{t=t_0}$$

If one assumes that $t_0$ is the time point for switching on the voltage supply across the phase winding and that $i(t_0) = 0$, i.e. no current is flowing in the phase winding at the switching on, the equation can be re-written as $$\int_{t_0}^{t_1} (U - R^*i)dt = L(t_1)^*i(t_1)$$

where $t_1$ is variable.

The equation is re-written as $$L(t_1) = 1/i(t_1) * \int_{t_0}^{t_1} (U - R^*i)dt$$

The desired condition $L > L_k$ is obtained as $$1/i(t_1) * \int_{t_0}^{t_1} (U - R^*i)dt > L_k \qquad (2)$$

i.e.

$$\int_{t_0}^{t_1} (U - R^*i)dt > L_k^*i(t_1)$$

The equation (2) gives the aforementioned fundamental condition according to the invention. In order to be able to check the condition according to the equation (2), which for each phase needs to be tested only from the time of switching on the phase to the time at which the fundamental condition is fulfilled, the following circuit is provided for each phase:

For the purpose of sensing the voltage U continuously, a voltage divider comprising two resistors Ra1, Rb1 and Ra2, Rb2 and Ra3, Rb3, respectively are connected between ground and the upper end of the phase winding in FIG. 1. The voltage divider has a relatively high total resistance, in order not to load the phase winding circuit unnecessarily. A suitable fraction of the voltage U, i.e. k.U is taken out over the respective grounded resistor Ra1, Ra2 and Ra3. A multiplex unit 3 has an input connected to the output of each of the three voltage dividers. The multiplex unit 3 is controlled by the control unit 1 such as to couple to the output of unit 3 the signal from the voltage divider for the phase winding whose inductance is to be measured. This can only be effected with one control conductor and the switching process thus takes place in a cyclic sequence for each "1"-signal on the control conductor. In order to reach the voltage U, the output signal from the unit 3 is divided with k in a dividing circuit 4.

A multiplex unit 5 has three inputs connected to a respective resistor R1, R2, R3, all of which have the resistance R'. The fourth input will be described hereinafter. The multiplex unit 5 is controlled by the control unit 1 synchronously with the control of the multiplex unit 3. In this case, however, the control unit 1 produces a digital signal which indicates which input shall be connected to the output.

The output signal from the multiplex unit 5 is applied to a multiplier 6, which multiplies by the resistance R for the whole winding circuit divided by the resistance R'. The output signal from the circuit 6 has the value R1. The output of the dividing circuit 4 having the voltage U is connected to the (+)-input and the output to the multiplier circuit 6 having the voltage R1 is connected to the (−)-input of a differentiator 7, so that the voltage on its output is (U−Ri). This signal is supplied to an integrating circuit 8, which integrates the signal from the circuit 7 during times determined by the control circuit 1. The circuit 8 commences a new integration with the control signal obtained from the control circuit 1. This control signal is supplied to the circuit 8 each time a phase is activated.

The output of the multiplex unit 5 is also connected to a multiplier 9, which multiplies the signal R' with $L_k/R'$. The output signal from the unit 9 thus obtains the value $L_k.i$, where $L_k$ is the inductance to be detected.

The signals from the integrator 8 and the multiplier 9 are each fed to a respective input of a comparator 10, which produces a "1"-signal on its output as soon as the value of the signal from the integrator 8 exceeds the value of the signal from the circuit 9.

When the control unit 1 receives a positive signal from the comparator 10 and this does not lie within an unpermitted time interval, as described in more detail hereinafter, the fundamental condition is detected for the actual phase. The control unit 1 can then directly send control signals to the multiplex units 3 and 5 in order to switch them and to allow signals from the next phase in turn to be sensed to pass through. Alternatively, this switching can be provided in connection with the time of switching on the voltage supply to this phase.

It should be observed, however, that the control unit 1 does not immediately de-activate the phase in question upon the fulfillment of the fundamental condition according to the equation (2). Instead, the control unit 1 carries out calculations according to pre-set conditions, in order to establish the time at which the commutation is going to be provided. These conditions are dependent partly on the rotational speed ω of the rotation and partly on the current strength i in the monitored phase. This is described hereinafter with reference to the diagrams of FIGS. 2-5.

Consequently, the value of the current i must be fed directly to the control unit 1. The output of the multiplex unit 5 is therefore connected to an analogue/digital converter 11 and is fed to a separate input on the control unit 1, which divides the value obtained by R', in order to obtain the value of i. The value of i is also used when driving the motor within the low speed range, as will be described in more detail hereinafter.

Figure 2:
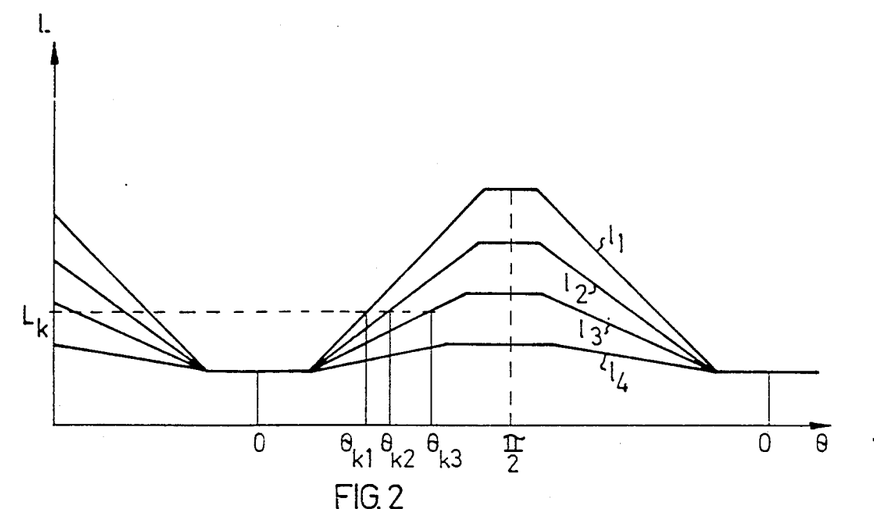
FIGS. 2–5 are diagrams which illustrate the manner in which the invention operates.

As beforementioned, the $L_k$-condition, or fundamental condition, in the equation (2) gives an $L_k$-condition angle $\theta_k$, which is dependent on the current strength in the winding, i.e. in the phase winding which has just been driven by the control unit 1. This is because the inductance is not solely a function of the rotor position, but also of the current i. This is illustrated in FIG. 2, which shows the variation of the inductance L in one phase as a function of the rotor angle $\theta$ over slightly more than one revolution. The diagram shows four different curves $l_1, l_2, l_3, l_4$, of which each curve is drawn for a separate constant current strength, where $l_1$ is drawn for a very low current strength and $l_4$ is drawn for a very high current strength. The current strengths, in turn, are contingent, inter alia, on the extent to which the motor is loaded or driven. The fact that the curve shape becomes flatter with increasing current strengths is because the iron in the magnetic circuit of the motor is saturated to progressively greater extents. It is not a constant current strength which determines the actual curve shape of the inductance L, but the fact that the inductance L varies in accordance with the prevailing or momentary current i, although FIG. 2 illustrates how the inductance varies with current strength.

It will be seen from FIG. 2 that $\theta_k$ for detected $L_k$ is displaced to increasing rotor position angle at increasing current strength. It will also be seen from FIG. 3 that at positive rotation direction, when the rotor position angle is increasing with the rotation, the time $t_{off}$ for disconnection of a phase winding switched on, which time corresponds to the rotor position angle $\theta_{off}$, will occur after the time $t_k$, which corresponds to $\theta_k$ in the figures.

Hereinafter it is presupposed that the rotational direction is positive, i.e. that the rotor position angle is increasing with the rotation, and that the angular speed is constant during the rotation position intervals mentioned below due to the motion energy stored in the system. The angular speed is constant because a rotor position change is to correspond to a given time.

Figure 3:
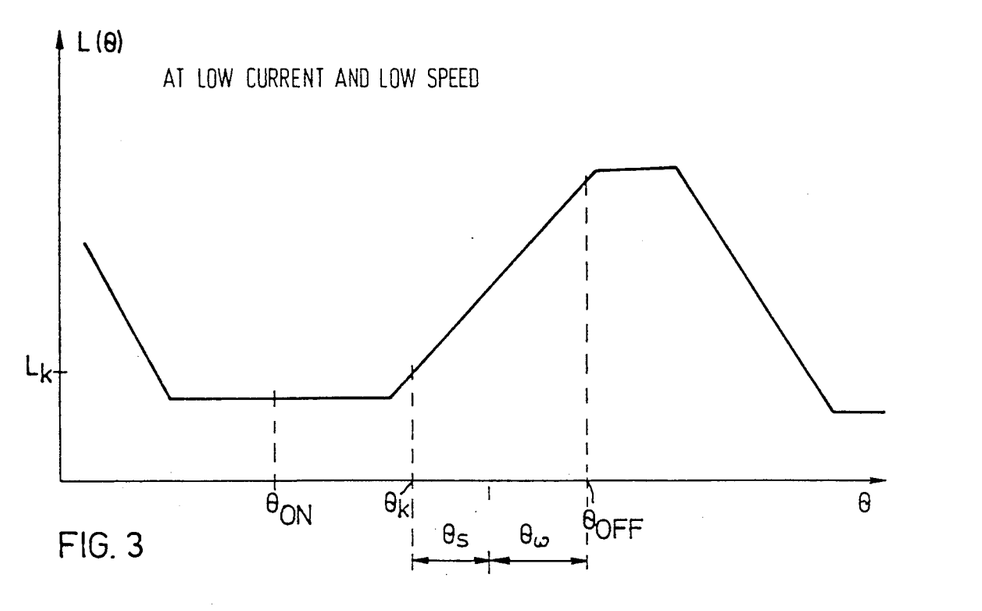
Figure 4:
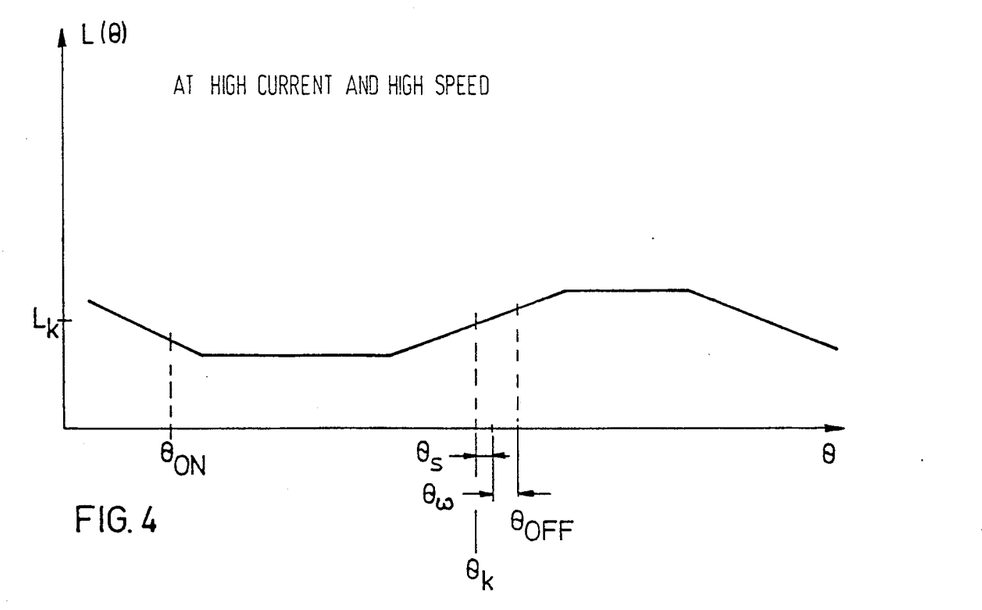

The angle $\theta_{OFF}$, i.e. the rotor position angle at which excitation or activation of the phase concerned is discontinued, should also vary with the rotational speed of the motor. At constant $\theta_{OFF}$ the motor obtains a series motor characteristics, i.e. the power is inversely proportional to the speed. If $\theta_{OFF}$ is permitted to decrease with increasing speeds, the motor obtains a flatter torque/speed characteristic and it is possible to obtain a motor with, e.g., constant power, by controlling $\theta_{OFF}$. This is achieved by introducing a further delay $\theta_\omega$ in addition to $\theta_S$ prior to shutting down the phase at $\theta_{OFF}$, this delay depending upon rotational speed. FIG. 3 illustrates a curve shape of the inductance L as a function of $\theta$ for a motor driven with a low current and at high speed, whereas FIG. 4 illustrates a curve shape of inductance L as a function of $\theta$ for a motor driven by a high current and at high speed. Thus, it will be seen from FIG. 3 that both $\theta_s$, which is the current-dependent current compensation factor, and $\theta_\omega$, which is the speed-dependent compensation factor, are low, so that the time between $\theta_x$ and $\theta_{OFF}$ is relatively long. FIG. 4 shows that both $\theta_s$ and $\theta_\omega$ are short, and hence the time between $\theta_k$ and $\theta_{OFF}$ will also be short.

The range of variation for the aforesaid compensation may be relatively large in the case of a number of motors, in which case the fundamental condition $L > L_k$ must be fulfilled at an early stage. It is even conceivable that the compensating times will exceed the integration times t. This is illustrated in FIG. 3 where the combined time of $\theta_s$ and $\theta_\omega$ is greater than the time between $\theta_{ON}$, which represents the rotational angle at which the phase is activated or excited, and $\theta_k$. Since the drive circuit according to the invention is intended to replace a sensor circuit for a reluctance motor, and the control unit 1 is preferably a microprocessor, it is suitable in one practical application to manufacture a reference motor which is provided with normal sensor control and to investigate where the motor equipped with sensor control de-activates the phase at $\theta_{OFF}$, by operating the motor at different speeds and at different loads, and indicating $\theta_k$ and storing the delays between $\theta_k$ and $\theta_{OFF}$ in a fixed memory in the microprocessor. As beforementioned, it is convenient from the aspect of drive techniques to permit $\theta_{OFF}$ to constitute a commutating angle at which transition from the excitation of one phase to the excitation of the next phase takes place immediately.

Figure 5:
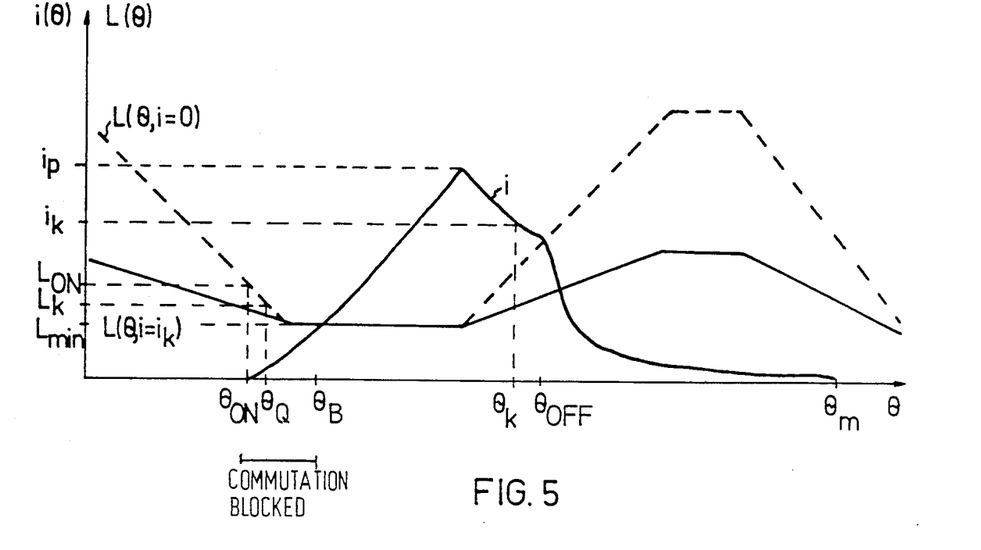

At high rotor speeds, commutation shall take place very early, and the delay $\theta_\omega$ therewith moves towards 0. It is possible that phase activation at $\theta_{ON}$ for the next phase $L_{ON}$ is greater than the fundamental condition inductance $L_k$. $L_{ON}$ may also be greater than $L_k$ when the current level i in a preceding phase is high at the time that commutation takes place, so that $\theta_s$ becomes small. FIG. 5 illustrates this circumstance. The broken line curve illustrates the variation of the inductance L as a function of $\theta$ for i=0 and the full line curve illustrates the variation L as a function of $\theta$ when i=$i_k$=0.

When a phase is activated, i=0 is included in this phase. The inductance then follows the broken line curve. At the rotation angle $\theta_{ON}$, the inductance in the phase winding is $L_{ON}$. As will be seen from the left-hand side of the diagram, $L_{ON}$ can be greater than $L_k$ and also much greater than when the current $i_k$ flows in the winding (see the full line curve).

The current i rises relatively slowly from the value 0 upon activation of the phase at $\theta_{ON}$, and is relatively low during the first part of the activation period during which $L \geq L_{min}$. The inductance in this case roughly follows the broken line curve.

Thus, an interval of the L-curve can be found right at the beginning of a phase supply, i.e. from $\theta_{ON}$ to $\theta_Q$ in FIG. 5, during which the fundamental condition $L > L_k$ is fulfilled. It is important to prevent the phase from being de-activated during this interval. Consequently, in accordance with the invention, sensing of the fundamental condition can be blocked for a given period of time subsequent to activation, up to a rotational angle $\theta_B$, spaced from $\theta_Q$ by a good margin. This additional blocking feature can be inserted, e.g., for speeds above a pre-set level and/or for currents $i_k$ above a pre-set level. Such blocking may also be made a general feature. Interference margins are also improved with such blocking, as opposed to when blocking is not utilized, since it is then no longer necessary to compare $L_k \cdot i$ and $\int(U-R \cdot i)d\tau$ for small drive angles, during which both magnitudes are small.

As mentioned in the aforegoing, the $L_k$-condition according to equation (2) was derived under the proviso that the current i in the winding must be zero amperes at the time of phase activation. This can prove problematic since back emf flows in the phase winding long after a phase has been deactivated at $\theta_{OFF}$, as will be seen from the right-hand part of the curve i in the FIG. 5 diagram.

In order to guarantee that there is no current in the phase winding at the time of activation, phase activation is blocked in accordance with the invention until it is sure that the current is zero. This current is not measured across the current measuring resistors R1, R2, R3, when the phase is unactivated, since the lower transistor Ta1, Ta2, Ta3, (FIG. 1) is switched off prior to activation. A phase activation blocking function can be obtained in at least two different ways.

Figure 6:
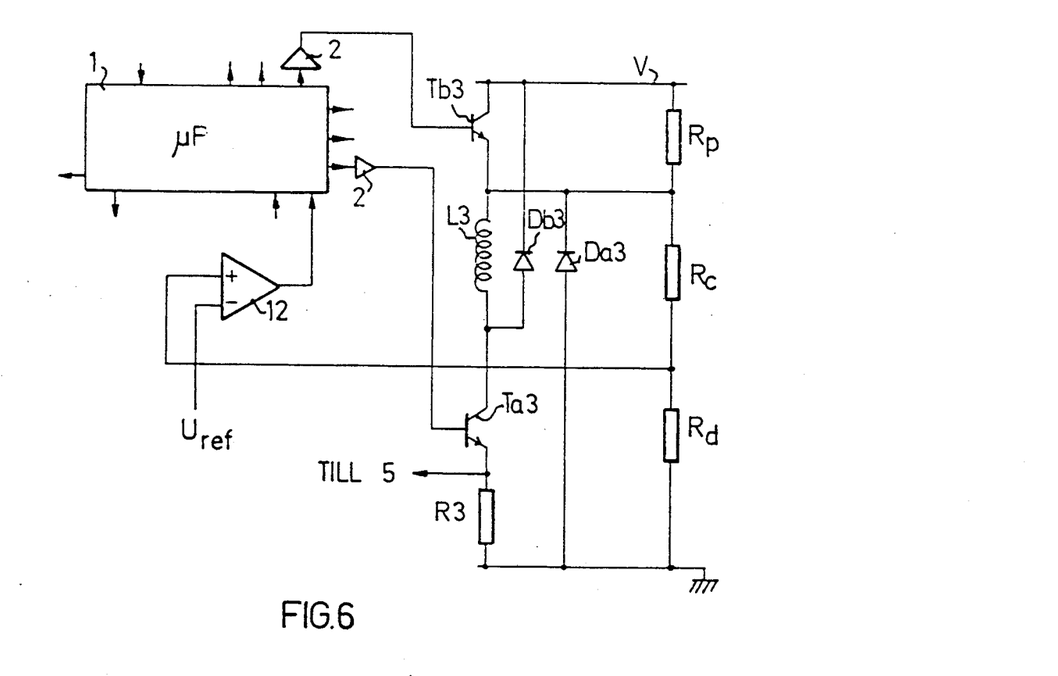
FIG. 6 illustrates a circuit for supplementing the circuit shown in FIG. 1.

The first method of obtaining a blocking function is illustrated in FIG. 6, which shows the third phase winding L3 and associated energizing circuits Ta3, Tb3, R3, Da3, Db3, together with the control unit 1, and the amplifiers 2 in accordance with FIG. 1, and with additions to this circuit for providing the activation blocking facility. Each phase winding circuit in FIG. 1 shall be provided with the same addition means as those illustrated in FIG. 6. This means includes a so-called "pull-up" resistor $R_p$ which is connected between the upper part of the phase winding L3 and the positive terminal of the supply voltage. A voltage divider Rc and Rd is connected in series with the "pull-up" resistor Rp and earth. The outlet on the voltage divider Rc and Rd is connected to a comparator 12, which has a reference voltage $U_{ref}$ coupled to its other input. The voltage over the voltage divider is approximately 0V for as long as back emf prevails. Upon termination of the back emf, the voltage rises via $R_p$ to approximately the level of the supply voltage V.

The comparator 12 will transmit a logic signal "0" for as long as back emf continues, and transmits a "1"-signal as soon as the back emf is terminated. Naturally, an equally good result can be obtained by sensing the lower winding outlet on the phase winding with a so-called "pull-down" resistor, or by using the same principle with some other winding configuration, e.g. a bifilar winding. This has not been shown in the drawing however.

The other method of blocking phase activation is one of utilizing the fact that the back emf time is constantly shorter than the drive time at a constant supply voltage V. This can be seen from the curve i in FIG. 5. The phase winding is deactivated when the rotor angle is $\theta_{OFF}$. Subsequent hereto the current i falls along an exponential curve and reaches the value 0 at the rotation angle $\theta_m$. The time between $\theta_{OFF}$ and $\theta_m$ is therewith always shorter than the time between $\theta_{ON}$ and $\theta_{OFF}$. Consequently, there is measured the total time for which V is applied over the energizing circuit of the phase winding concerned, i.e. the time between $\theta_{ON}$ and $\theta_{OFF}$, and activation of this phase is then blocked until back emf has continued for the same period of time. Although this implies an overestimation of the back emf time, it lacks all practical significance. Practical tests have shown that this type of blockaging facility has no practical influence on the acceleration of the motor.

The aforedescribed drive arrangement provides positive commutation under normal motor operation. At very high currents, however, there is a chance that commutation will be excluded due to non-fulfilment of the condition according to equation (2). This will occur when the current is so high as to prevent the inductance reaching to the level $L_k$. This is illustrated in FIG. 2 by the lower curve $L_4$. The three inductance curves $l_1$, $l_2$, $l_3$ reach and exceed the level $L_k$. Commutation will then take place. The curve $l_4$ fails to reach the level $L_k$. In this case there is no commutation. The problem is partially solved by selecting $L_k$ at a low inductance and to combine this lower value of $L_k$ with the aforesaid delays $\theta_s$ and $\theta_\omega$, as illustrated in FIGS. 3 and 4. This provides a satisfactory solution when a chopping function is incorporated for pulsing the drive of the phase windings, as effected with the upper transistors Tb1, Tb2, Tb3 in FIG. 1. This limits the current to a sufficiently low value. There are times, however, when this is not sufficient, particularly when the peak current is much higher than the maximum current with commutation. Such a curve shape is illustrated in FIG. 5, where the current i reaches a peak value $i_p$, which lies far above the current $i_k$, measured at $\theta_k$.

In order to guarantee that commutation will always take place even with extreme overcurrents, there is utilized a high current limiting level. This high current limiting level must always be found in a motor, in order to protect the electronics thereof, and this level is now used in accordance with the invention to provide a commutating signal in the manner described in more detail herebelow.

As illustrated in FIG. 1, the current in the activated phase winding is sensed continuously by the control unit 1 via the analogue/digital converter 11. When sensing the lower current limiting value, the upper power transistor Tb1, Tb2, or Tb3 is switched-off. The current i then falls normally. Subsequent to switching-off the one power transistor in the winding circuit, current is only able to rise when the inductance of the motor decreases. If the current should rise subsequent to switching-off the upper power transistor, this would mean that the position of maximum inductance of the inductance curve has been passed without commutation taking place and that there has been reached an angular position which lies somewhere on the negative flank of the inductance curve. The motor will then produce a drive-emf and the current will increase. Thus, if the current increases subsequent to sensing maximum current, commutation shall take place immediately.

Figure 7:
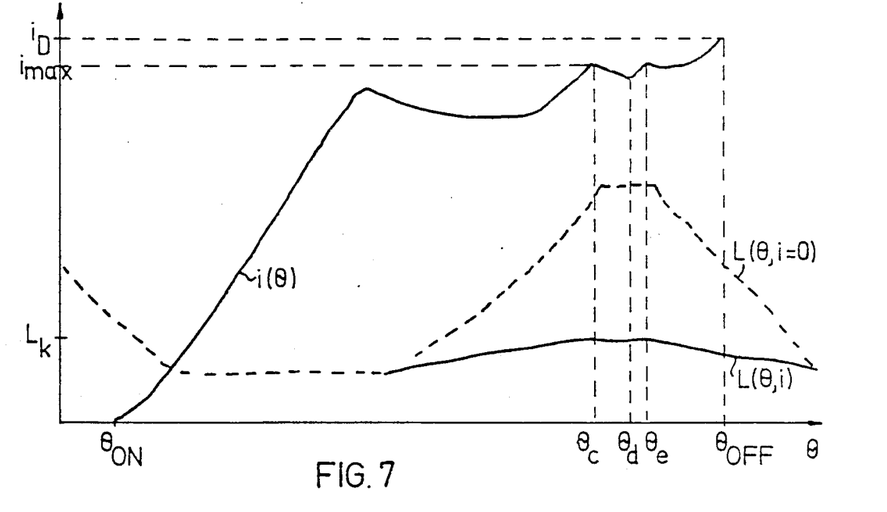
FIG. 7 is a further diagram which illustrates the manner of operation of the invention.

The diagram in FIG. 7 illustrates an example of the shape of the curve $i(\theta)$ in the case of commutation when $L_k$ is not sensed. At the rotation position $\theta_c$ the overcurrent or excess current $i_{max}$ is sensed. The upper power transistor Tb1, Tb2 or Tb3 is therewith switched off. The current $i(\theta)$ then falls. The upper power transistor is again switched-on at $\theta_d$ and the current rises and again reaches $i_{max}$ at the rotational position $\theta_e$, the upper power transistor again being switched off. The inductance curve, however, has now passed its maximum, as shown in the full line curve $L(\theta, i)$. The current $i(\theta)$ now no longer falls, but instead rises relatively slowly. At the rotation position $\theta_{OFF}$ there is sensed a current $i_D$ which is higher than $i_{max}$. Commutation to the next phase then takes place immediately.

Instead of sensing maximum current through the analogue/digital converter 11, it is possible as is usual in such circumstances, to provide an additional comparator circuit constructed to sense excess current separately and to indicate directly to the control unit 1 when excess current or overcurrent is reached. There is therefore illustrated in broken lines in the circuit shown in FIG. 1 a voltage dividing circuit which includes three series-connected resistors Re, Rf, Rg between the positive terminal on the voltage source V and ground. The outlet between the resistors Rf and Rg is connected to a reference voltage input on a comparator 13 and the outlet between the resistors Re and Rf is connected to a reference voltage input on a comparator 14. The output from the multiplex unit 5 is coupled to the (+)-input of both comparators 13 and 14. The voltage across Rg is so selected that the comparator 13 will produce a "1"-signal as soon as the pre-set maximum permitted current level $i_{max}$ has been reached. The reference voltage to the comparator 14 is somewhat higher than that for the comparator 13. Consequently, the comparator 14 will produce a "1"-signal for a current level which is slightly higher than the maximum permitted level $i_{max}$. Each of the outputs of the comparators 13 and 14 is connected to a respective input on the control unit 1, which controls in the manner aforedescribed. As will be seen from FIG. 1, the control unit 1 is also supplied with a control signal from without on a parallel input. This control signal indicates to the control arrangement the speed desired. The control signal also indicates to the control arrangement when the motor is to be started and stopped.

A special start function is required for starting the motor. The simplest method in this regard is for the control arrangement to impose a current pulse on a phase by steering the two power transistors in the phase for a second or two, so that the motor locks in the maximum inductance state for this phase. Forced commutation is then effected to the next phase, whereafter subsequent commutations are effected in the aforedescribed manner.

The aforedescribed sensing and control principle operates satisfactorily at high and average rotational speeds and provides equally as good commutation as will a conventional sensor. Theoretically the principle can function right down to rotational speeds of zero revolutions per second. In this latter regard, however, it is necessary to carry out precise compensation of the winding resistance, which resistance obtains an increasing significance at precisely low speeds. It is difficult to determine the winding resistance exactly, however, since the resistance varies, inter alia, with motor temperature. Consequently, it is difficult in practice to carry out accurate compensation at low speeds.

Tests have shown that the aforedescribed sensing and control principle functions satisfactorily down to 5% to 10% of the maximum speed of the motor, and is able to function at still lower speeds, including zero speed conditions, provided that the motor is only subjected to small loads.

However, in order to obtain a control system which will operate satisfactorily under all conditions throughout the whole of the speed range, the system according to the invention is constructed to monitor the motor speed and to detect or sense when the motor holds a pre-determined, relatively low speed $v_n$, e.g. a speed which is 20% of the maximum motor speed.

At speeds above $V_n$ the circuit illustrated in FIG. 1 operates in accordance with the aforedescribed principle, by determining the inductance of the phase winding which is activated to find an inductance value $L_k$ which forms a starting point for determining the time for deactivating the phase.

At speeds beneath the speed $V_n$ it is suitable instead to sense the inductance of the phase which is to be activated in order to detect an inductance value at which commutation shall take place for activating the phase.

Since no current will normally flow in an unactivated winding, the winding inductance must be indicated in a manner different to that described above. Consequently, high frequency pulses of short duration are supplied to the gating means of the power transistors in the drive circuit for that winding which is next in turn for activation. Each pulse is of a given duration t, which is short in relation to the period time, so that the current is able to fall to zero between each pulse. The current is measured by the analog/digital converter at the end of each pulse. The current rise over the duration of each pulse provides a measurement of the momentary inductance. Thus, within this speed range the control unit 1 instructs the multiplex unit 5 to supply voltage across the resistors R1, R2, R3 incorporated in the phase circuit which is next in turn for activation and not in the prevailing activating phase circuit as in the case of the high speed range.

The control unit 1 determines the inductance by approximating the equation $(U-Ri)=d/d\tau(Li)$ with $U=L \cdot di/d\tau$, which is a good approximation for small currents i and low speeds, i.e. low $dL/d\tau$.

The U.S. Pat. No. 4,520,302 mentioned in the introduction describes a system m which measures time for current change in a non-exciting phase, which in practice implies measuring the inductance in this phase. Consequently, according to this prior publication commutation is effected when the inductance in the phase on which measurements are made has reached a predetermined value.

In this known control system it is assumed that the drive voltage is constant. In practice, however, the drive voltage V can vary radically, partly due to normal voltage variations and partly due to the voltage ripple obtained when $+V$ is a rectified a.c. voltage.

The inductance in a non-exciting phase is also contingent on the current strength of the exciting phase. Neither does the U.S. Pat. No. 4,520,302 take into account those variations in inductance which are due to current level, which renders lt difficult to drive the motor described therein at different loads. As discussed in the aforegoing, the inductance in a phase is highly dependent on the current prevailing therein. Parts of the iron circuit of present day reluctance motors are most often common to the various phases. Saturation, and therewith reduced inductance in a phase (see FIG. 2), therefore results in partial saturation and therewith reduced inductance also in remaining phases.

Consequently, FIG. 2 can, in principle, also be said to describe the inductance in a phase as a function of the current i in another phase, particularly when the current is low in the phase on which the measurement is made. Thus, the various curves in FIG. 2 can be said to correspond to different currents in the exciting phase when a non-exciting phase is measured.

Consequently, in accordance with a further development of the invention, compensation is made within the low speed range, i.e. speeds beneath $v_n$, both for varying supply voltage $+V$ and for varying voltage in the energized winding. A voltage divider comprising two series-connected resistors $R_x$ and $R_y$ is connected between the positive terminal at $+V$ on the voltage source and ground. The $R_x$, $R_y$ outlets of the voltage divider are connected to the fourth input of the multiplex unit 5. The voltage U' measured across $R_y$ is therewith proportional to $+V$.

For each pulse of short duration transmitted to the monitored winding the control unit 1 will now steer the multiplex unit 5 in a selected sequence the voltage across the resistor R1, R2 or R3 in the monitored phase, the voltage over the measuring resistor R1, R2, R3 in the energized phase and the voltage U' over the resistor $R_y$.

The control unit 1 thus indicates the momentary current at the end of each short-duration pulse sent to the monitored winding in the non-energized phase, by supplying a control pulse to the control input of the analog/digital converter 11 upon termination of the short duration pulse. In conjunction herewith, i.e. immediately before or after, an indication is also given of the current in the energized phase and the voltage U' by steering the multiplex unit 5 and the analog/digital converter 11 at appropriate time points. The control unit 1 then receives on its inputs connected to the analog/digital converter 11 signals having known proportions to those signals which are desired to be measured.

In order to obtain a rotor position point $\theta_{OFF}$ which is as constant as possible for a selected rotor speed, it is fully possible to carry out compensation with varying compensation in a manner analogous with the manner carried out with $\theta_s$ within the high speed range. This cannot be effected, however, when the motor is stationary, i.e. when actually starting the motor.

Consequently, it is more advantageous to determine instead the momentary inductance, or a value proportional thereto and to compensate the inductance value determined.

The function $L_a(\theta, i_b)$, i.e. the inductance in a phase a as a function of the current in a phase b, is not linear with $i_b$. A good approximation for the majority of types of reluctance motors is most often $$L_a(\theta_c, 0)/L_b(\theta_c, i_b) = (1 - c \cdot i_b)$$

where the constant c is determined individually for each motor, so as to maintain $\theta_{OFF}$ constant. $\theta_c$ now corresponds to $\theta_k$ within the high speed range. $\theta_{OFF}$ is preferably equal to $\theta_c$ within the low speed range. Naturally, this will apply provided that compensation of the inductance is effected in the aforedescribed manner. The commutating condition to be fulfilled upon compensating the inductance for both momentary supply voltage level and energizing current level is then:

$$L = L_c \rightarrow (1 + c \cdot i_b) \cdot U \cdot T/i = L_c$$

This enables a purely static commutation to be obtained irrespective of the current strength of the energized phase and the supply voltage.

Static commutation which is independent of rotor rotation in the aforesaid manner can also be obtained provided that the speed is low. Firstly it is necessary that the approximation $d/d\tau(L \cdot i) = L \cdot di/d\tau$ applies (i.e. in $dL/d\tau << Ldi)/d\tau$), and secondly it is necessary for the frequency of the inductance-sensing pulses to be much higher than the motor commutating frequency.

since this frequency determines the time division in the commutating process.

In practice these limitations imply that the motor can be driven solely between 20% and 50% of its maximum speed when applying this commutating method. At speeds beneath this limit, however, there is obtained a function which corresponds completely with the function obtained with a rotor position sensor.

The rotor point $\theta_{OFF}$ has been discussed in the aforegoing with reference to FIGS. 3 and 4. It will be understood that each phase winding can be energized individually and in a manner to operate optionally, with overlap between the phases, such that two phases are driven simultaneously during given intervals. If, however, overlap between the phases is not employed by that commutation is effected at the rotation angle $\theta_{OFF}$ from one phase to another, $\theta_{ON}$ will be displaced within the rotor angle in the same manner as $\theta_{OFF}$.

In FIG. 3, where $\theta_{OFF}$ lies relatively close to the upper part of the inductance curve, $\theta_{ON}$ lies within a range of the inductance curve in which the inductance is lowest.

At high speeds and high currents $\theta_{OFF}$ will move further to the left i.e. downwardly on the rising part of the inductance curve, as illustrated in FIG. 4. $\theta_{ON}$ will therewith also move to the left, as illustrated in FIG. 4, and in the case of normal operation will actually occur at an interval on the inductance curve in which the curve has a negative slope. This is also illustrated in both FIG. 5 and FIG. 7.

In the case of extremely low speeds it may be suitable in the aforedescribed energizing process for the low speed range to activate or energize the phase immediately at the beginning of the rising part of the L-curve, although in the case of somewhat higher speeds within the low speed range, and in particular when the speed approaches the speed $v_n$, it may instead be suitable to move the rotation-position $\theta_{ON}$ at which activation is initiated farther to the left, so that activation already takes place on the negative flank of the inductance curve immediately prior to the region of very low inductance. This results in improved and smoother functioning of the motor, particularly when the motor passes the speed $v_n$, where the drive circuit switches from a driving or energized mode in the low speed range to a driving or energized mode in the high speed range. Displacement of the activation point $\theta_{ON}$ from a rising flank of the inductance curve to a falling flank of said curve can be carried out continuously. It is difficult, however, to sense an inductance differential during the next straight part of the inductance curve when inductance is very low, and consequently it may be suitable instead to move $\theta_{ON}$ continuously during the rising and falling parts of the inductance curve and to execute stepwise movement between these locations. The activation point may also be moved stepwise in a number of stages. The possibility of displacing the activation point becomes more significant with fewer phases. Consequently, the greatest significance of this displacement possibility lies with motors having two or three phases.

The control unit 1 is therefore conveniently provided with a program for the low speed range in which the inductance value and the sign for inductance change for giving $\theta_{ON}$ is different for different speeds or speed ranges within the low speed range.

The boundary speed $v_n$ at which the control system switches between sensing modes can be selected with a relative degree of freedom, although it preferably lies within the range of 10–20% of the maximum speed. Naturally, this switching between the sensing modes takes place with a given hysteresis in speed.

With a suitably selected boundary speed $v_n$, which boundary speed may be different with different motor constructions, it is possible to obtain commutation over the whole speed range of the motor, this commutation corresponding totally to the commutation obtained with a rotor position sensor. Conseqeuently, a variable reluctance motor provided with the control system according to the invention can be driven at all speeds from a stationary state to a state of maximum rotor speed under optimum operating conditions.

Many modifications are possible within the scope of the invention.

We claim:

1. An energizing system for a variable reluctance motor including a stator having at least one winding for at least one phase and rotor the position of which influences the permeance in each stator winding, comprising
   (a) means for sensing the inductance of each winding at least during a portion of the revolution of the rotor when a respective phase is energized;
   (b) means for indicating when the inductance of each winding reaches a predetermined inductance $L_k$;
   (c) rotor position sensing means for sensing the rotor position when said predetermined inductance is reached to define a rotor starting point;
   (d) control means for controlling the energized state of said sensed winding in accordance with a rotor position relative to said starting point.

2. An energizing system according to claim 1, wherein when the predetermined inductance $L_k$ is reached, said control means deactivates the winding energization subsequent to a time delay which is dependent on predetermined operating parameters of the motor at the moment concerned.

3. An energizing system according to claim 2, wherein one of the operating parameters is the prevailing current strength in the phase winding.

4. An energizing system according to claim 2, wherein one of the operating parameters is the prevailing motor speed.

5. An energizing system according to claim 1, wherein for each phase, at least during the time of monitoring said phase, the current in the phase winding is indicated over a resistor (R1, R2, R3) connected in series with the winding (L1, L2, L3); the voltage across the winding and the resistor is indicated; and further comprising means for continuously forming and making a comparison between the following values $$\int_0^t (U - R \cdot i)d\tau \text{ and } L_k \cdot i$$

where U is the indicated voltage, i is the indicated current, R is the resistance of the resistor (R1, R2, R3) added with the resistance of the phase winding, and $L_k$ is a constant, the time $t=0$ being set upon activation of the phase; said rotor position sensing means indicating the rotor position when the comparison indicates that the inductance of the phase winding is $L_k$.

6. An energizing system according to claim 5, wherein said control means responds to said comparison after the rotor has rotated through a predetermined rotor angle subsequent to the energization ($\theta_{ON}$) of the particular phase being monitored.

7. An energizing system according to claim 1, wherein said control means prevents the energization of a deenergized phase until after a time point at which the current through the phase winding is 0.

8. An energizing system according to claim 7, wherein said control means determines the time between energization ($\theta_{ON}$) and deenergization ($\theta_{OFF}$) and prevents steering the phase to energization the next time until there is reached a time point which at least equals the time lapse after the time of deenergization ($\theta_{OFF}$).

9. An energizing system according to claim 1, and further comprising means for sensing when the current passing through the winding in the energized phase reaches a predetermined highest permitted current level, and for adjusting energization of the phase by supplying pulses to the winding; said control means effecting commutation for energizing the next phase when the current in the monitored phase winding during a pulse pause having a predetermined level exceeds the predetermined highest current level.

10. An energizing system according to claim 1, and further comprising means for indicating rotor speed; said inductance sensing means operating at speeds above a predetermined speed $v_n$ to monitor the inductance in the energized phase winding to indicate an inductance which can constitute a starting point for calculating deenergization of the phase, and at speeds beneath the predetermined speed $v_n$ to indicate the inductance in the phase winding of the phase which is next in turn to be energized, in order to obtain a time point for energizing said phase.

11. An energizing system according to claim 10, wherein at least at speeds beneath the predetermined speed $v_n$, the point of the inductance curve at which said control means steers the phase to energize is different for low and high speeds within said speed range, whereby said control means steers the phases to energize at a rotor position in which the inductance curve has a positive flank, at very low speeds, and at a rotor position in which the inductance curve has a negative flank, at speeds which lie relatively close to $v_n$.

12. An energizing system according to claim 10, and further comprising means for sensing the current in the phase winding in the energized phase at speeds beneath the predetermined speed ($v_n$) and for correcting the indicated inductance in the phase winding in the phase which is next in turn for energizing with a factor which is dependent on the current in the energized phase.

13. An energizing system according to claim 10, and further comprising means for sensing a momentary drive voltage level at speeds beneath the predetermining speed ($v_n$) and for correcting the indicated inductance in the phase winding in the phase which is next in turn for energizing with a factor which is dependent on the prevailing drive voltage level.

14. An energizing system according to claim 10, and further comprising means for supplying voltage pulses of short duration over the phase winding in the phase next in turn to be energized at speeds beneath the predetermined speed ($v_n$), and for measuring for each pulse the current level $i_a$ in said phase winding upon termination of the pulse having a duration t, and for measuring the current $i_b$ in the phase winding in the energized phase and for measuring the drive voltage U' in conjunction with measuring $i_a$, and for calculating the following inductance at each measuring moment:

$$L = (1 + c.i_b)U'.t/i_a$$

where c is a constant contigent on the motor concerned, and for comparing the calculated inductance with an inductance value $L_c$, for which commutation shall take place.

* * * * *